(12) United States Patent
Brown et al.

(10) Patent No.: US 6,728,304 B2
(45) Date of Patent: Apr. 27, 2004

(54) METHOD AND APPARATUS FOR PERFORMING A SIGNAL DETECTION AND ASSIGNMENT IN A WIRELESS COMMUNICATION SYSTEM

(75) Inventors: Tyler Brown, Mundelein, IL (US); Michael M. Wang, Hawthorn Woods, IL (US); Vagan Shakhgildian, Cambridge (GB)

(73) Assignee: Motorola, Inc., Schaumburg, IL (US)

( * ) Notice: Subject to any disclaimer, the term of this patent is extended or adjusted under 35 U.S.C. 154(b) by 301 days.

(21) Appl. No.: 10/025,056

(22) Filed: Dec. 18, 2001

(65) Prior Publication Data

US 2003/0112776 A1 Jun. 19, 2003

(Under 37 CFR 1.47)

(51) Int. Cl.$^7$ .......................... H04B 1/707; H04B 7/216
(52) U.S. Cl. ...................... 375/148; 375/144; 370/335; 370/342; 455/517
(58) Field of Search ................................ 375/140, 144, 375/147, 148; 370/335, 342; 455/67.11, 517, 561

(56) References Cited

U.S. PATENT DOCUMENTS

| | | | | |
|---|---|---|---|---|
| 5,881,058 A | * | 3/1999 | Chen | 370/335 |
| 6,108,324 A | * | 8/2000 | Brown et al. | 370/335 |
| 6,125,137 A | * | 9/2000 | Wang et al. | 375/148 |
| 6,169,731 B1 | | 1/2001 | Stewart et al. | 370/332 |
| 6,208,842 B1 | * | 3/2001 | Henderson et al. | 455/67.11 |
| 6,208,871 B1 | * | 3/2001 | Hall et al. | 455/517 |
| 6,370,397 B1 | * | 4/2002 | Popovic et al. | 455/561 |

FOREIGN PATENT DOCUMENTS

EP  1 065 807 A1  1/2001

OTHER PUBLICATIONS

Kane et al., *Performance of a Rake Demodulator with Pre–decision Multipath Thresholding*, pp. 1025–1029, 1990.
International Search Report PCT/US02/38081 dated Mar. 25, 2003.

\* cited by examiner

*Primary Examiner*—Young T. Tse
(74) *Attorney, Agent, or Firm*—Marshall, Gerstein & Borun LLP

(57) ABSTRACT

In a wireless communication system comprising an effective ray detector, a method for detecting and assigning a mobile station signal including receiving a plurality of search metrics, the plurality of search metrics including a plurality of offset energy values at corresponding time offsets, sorting the plurality of search metrics in order of their offset energy values, calculating a plurality of decoding success predictors, and selecting the decoding success predictor having the maximum value. The method also includes forwarding an acknowledgment message declaring signal detection to the mobile station if the maximum decoding success predictor has a value greater than zero. The method further includes assigning receiver demodulation at the time offsets associated with the maximum decoding success predictor if the maximum decoding success predictor has a value greater than zero.

25 Claims, 5 Drawing Sheets

METHOD AND APPARATUS FOR PERFORMING A SIGNAL DETECTION AND ASSIGNMENT IN A WIRELESS COMMUNICATION SYSTEM

FIELD OF THE INVENTION

The present invention relates generally to wireless communication systems and, more particularly, to a method and apparatus for performing a signal detection and a rake receiver finger assignment in a wireless communication system.

BACKGROUND OF THE INVENTION

Communication systems that utilize coded communication signals are known in the art. One such system is a direct sequence Code Division Multiple Access (DS-CDMA) cellular communication system, such as set forth in the Telecommunications Industry Association Interim Standard 2000 (TIA IS-2000) herein after referred to as IS-2000. In accordance with IS-2000, the coded communication signals used in the DS-CDMA system includes signals that are transmitted in a common channel, typically a 1.25 MHz bandwidth common channel, between mobile stations (MS) and base transceiver stations (BTS) located at the base sites (BS) of a wireless communication system. Each DS-CDMA signal includes, inter alia, a pseudorandom noise (PN) binary code associated with a particular base transceiver station and a PN sequence associated with a particular mobile station.

Another such system is a Universal Mobile Telecommunications System (UMTS) cellular communication system, such as set forth in IMT-2000. Like the IS-2000 system, UMTS is a DS-CDMA based technology that transmits signals in a common channel between mobile stations and BTS's.

During a typical wireless communication, a mobile station communication signal is supported by the BTS associated with the coverage area in which the mobile station is traveling. Such movement typically results in fading of the mobile communication signal due to multipath propagation of the transmitted signal. As is known, multipath propagation results from the reflections of the transmitted mobile communication signal off of nearby scatterers such as buildings. These reflections produce replicas, typically referred to as multipath replicas, of the originally transmitted signal. The multipath replicas, or signals, generally arrive at the BTS at various energy levels, generally below the originally transmitted mobile communication signal, and at various times. The various arrival times are expressed as an offset in time from a path with no propagation delay and are therefore referred to as time offsets. Additionally, multipath replicas are sometimes referred to as rays having offset ray energies at the various time offsets.

A multipath signal searcher assembly located at the BTS initially searches received signals across a range of time offsets to determine whether a transmitted mobile station communication signal has sufficient power for subsequent demodulation by a BTS RAKE receiver. Generally, an initial signal, for example a preamble signal, is transmitted by the mobile station to facilitate the initial signal search. In addition, prior to sending a message signal (voice or data), a mobile station transmits information to facilitate a call set-up or to register its location with a base station so that it may be notified of incoming calls. For example, in a UMTS system, the mobile station sends an origination or registration message to a base station via a UMTS Random Access Channel (RACH). When the mobile station is ready to transmit the information, it sets a transmit-power level to an initial value and then transmits the preamble signal containing a 4096 chip code sequence that is recognizable by the multipath signal searcher at the base station.

Upon receipt of the mobile station transmission, the multipath signal searcher assembly searches for the preamble code sequence. Once the code sequence is detected, the prior art search engine algorithm in the multipath signal searcher assembly first selects the offset ray energy having the highest power value and then compares that offset ray energy to a predefined threshold. Offset ray energies that do not have the highest power value, or offset energies which do have the highest power but fall below the predefined threshold, are discarded. If the maximum offset ray energy of the set of these ray energies is above the predefined threshold, then the base station replies to the mobile station with an acknowledgment on an Access Indication Channel (AICH). Upon receipt of the acknowledgment, the mobile station replies by transmitting its message frame. The multipath signal searcher assembly then forwards the time offset and frequency information a finger manager to initialize RAKE receiver fingers for demodulation of the mobile station's message frame.

If however, upon receipt of the code sequence, the multipath signal searcher assembly determines that the mobile station's transmit power is insufficient to support reliable message transmission, it does not send an acknowledgment. If the mobile station does not receive an acknowledgment after a fixed period of time, it increases its transmit power and retransmits the preamble. The process repeats until the mobile station's transmit power increases enough to cause receipt of a maximum energy ray above a predefined threshold by the multipath signal searcher, or a maximum number of preamble transmissions is reached.

As the mobile station increases it's transmit power, uplink signal interference increases. This is particularly damaging to wireless communication systems such as CDMA where system capacity is directly related to signal interference. Moreover, incorrect acknowledgments by the base station result in subsequent unreliable message transmissions from the mobile station which require the mobile station to restart the entire access procedure at a later time. This ultimately delays the reception of the message data, causes additional interference on the uplink channels, requires additional access channel hardware resources at the base station, causes additional congestion on the access channel, and reduces mobile battery life.

There are two problems associated with the prior art search engine algorithm for detection and demodulation. First, because the sensitivity of the base station receiver is limited by the predefined threshold used by the multipath signal searcher assembly, secondary rays which do not exceed the predefined threshold but which contain significant signal power are not tracked and decoded. Second, because the base station acknowledgment is triggered when one high powered ray, by itself, exceeds the predefined threshold, the mobile station often continues to increase its transmit power unnecessarily, even though a combination of secondary, or lower power, rays could be utilized for reliable message decoding.

DETAILED DESCRIPTION OF THE PREFERRED EMBODIMENT

Figure 1:
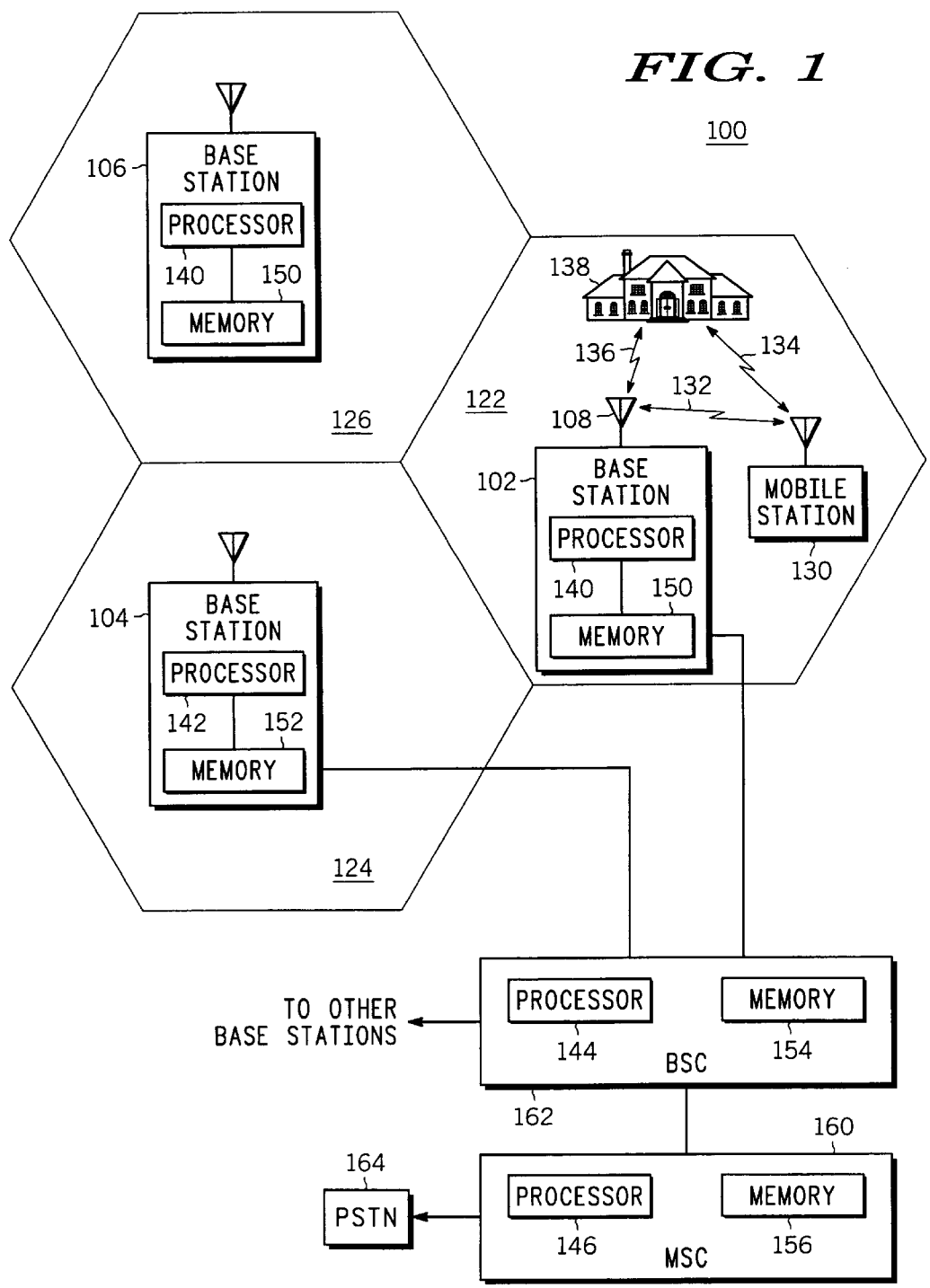
FIG. 1 depicts a DS-CDMA wireless communication system.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to perform a mobile station signal detection and RAKE receiver finger assignment which utilizes an optimum combination of one or more multipath signals rather than only one multipath signal that exceeds a predefined threshold value. An effective ray detector communicates with a multipath signal searcher and a base station RAKE receiver to detect and assign a mobile station signal.

In accordance with an embodiment of the invention, a method and apparatus for detecting and assigning a mobile communication signal, operates in a wideband code division multiple access wireless communication system. An offset energy sorter receives and sorts in order of offset energy values, a plurality of search metrics having a corresponding plurality of offset indices and a corresponding plurality of offset energy values. The resulting plurality of sorted search metrics has a corresponding plurality of sorted offset indices and a corresponding plurality of sorted offset energy values. A decoding success predictor (DSP) calculator calculates a plurality of decoding success predictors corresponding to a plurality of combinations of sorted offset energy values, the plurality of decoding success predictors indicating a likelihood of successful mobile station signal demodulation. A max DSP selector selects a maximum decoding success predictor having the highest numerical value from the plurality of decoding success predictors. A DSP threshold indicator forwards the maximum decoding success predictor if the maximum decoding success predictor has a value greater than zero. A message generator in the base transceiver station sends an Acknowledgment message to the mobile station declaring signal detection. In addition, a winning offset selector selects the offset indices corresponding the offset energy values used to calculate maximum DSP and subsequently forwards them to a RAKE receiver finger manager for demodulation assignment.

Turning now to the drawings, wherein like numerals designate like components, FIG. 1 depicts a CDMA wireless communication system 100 that may be adapted in accordance with the preferred embodiment of the invention. CDMA wireless communication system 100 may be a direct spread code division multiple access (DS-CDMA) cellular communication system, although a multi-carrier CDMA cellular communication system may be suitable. Although CDMA wireless communication systems may include multiple base sites with each base site having one or more BTSs, the CDMA wireless communication system 100 depicted in connection with FIG. 1 includes one base site having 3 base transceiver stations.

CDMA wireless communication system 100 includes base transceiver stations 102, 104, 106 providing service to coverage areas 122, 124, and 126 respectively, and one or more mobile stations although only one mobile station 130 is shown. Base transceiver stations 102 and 106 include, among other things, a processor 140 and a memory 150. Similarly, base transceiver station 104 includes, among other things, a processor 142 and a memory 152. Base transceiver station 102 includes a transceiver (not shown) which transmits coded communication signals to, and receives coded communication signals from mobile station 130 via an antenna 108. A receiver, preferably a RAKE receiver within the transceiver provides tracking and demodulation capability of incoming multipath signals from mobile station 130. Similarly, mobile station 130 includes a transceiver that transmits coded signals to, and receives coded signals from, base transceiver station 102 within a coverage area 122. Base transceiver station 102 further includes a multipath signal searcher assembly (discussed in connection with FIG. 2) capable of detecting high power multipath signals from mobile station 130 and capable of forwarding associated time offset and frequency information to a finger manager for demodulation by RAKE receiver fingers.

Base stations 102, 104, and 106 are coupled to a base station controller (BSC) 162, which includes, among other things, a processor 144 and a memory 154, and which is in turn coupled to a mobile switching center (MSC) 160, also including a processor 146 and a memory 156. MSC 160 is coupled to a public switched telephone network (PSTN) 164 using known techniques.

A signal 132 is conveyed between mobile station 130 and base station 102 through a radio frequency (RF) channel. The RF channel includes a reverse-link (mobile station 130 to base station 102) and a forward-link (base station 102 to mobile station 130). Signal 132 may contain numerous types of messaging such as a preamble indicating a call set-up, data, or voice and includes a pseudo-random short code (not shown) associated with and assigned by base station 102, and a mobile unique pseudo-random long code mask (not shown). The inclusion of the codes results in a mobile unique pseudo-random noise sequence (PN sequence) for mobile station 130, which is identifiable by the RAKE receiver at base station 102.

Signals 136 and 134 are multipath replicas, or rays, of a mobile communication signal such as signal 132 transmitted by mobile station 130, and result from reflections of signal 132 off of scatterers such as building 138. Multipath replica 136 and signal 132 arrive at base transceiver station 102 at different times, time offset from a reference time, commonly referred to as a time-offsets. The different time offsets of the multipath signals are the result of varying distances traveled by those signals.

In order to demodulate the transmissions from a particular mobile station, the base station receiver must first differentiate the multipath signals associated with a particular mobile station from other multipath signals as well as simple noise associated with other nearby transmitters. This identification of a particular mobile station's multipath signals, including their locations with reference to a time offset, begins as an antenna, or multipath signal search. In a DS-CDMA system, the time offset is measured in increments of time referred to as pseudorandom noise (PN) chips. Each PN chip is approximately equivalent to the inverse of the occupied bandwidth, e.g. 814 nanoseconds (ns) for a 1.2288 MHz system and 271 ns for a 3.866 MHz system.

Figure 2:
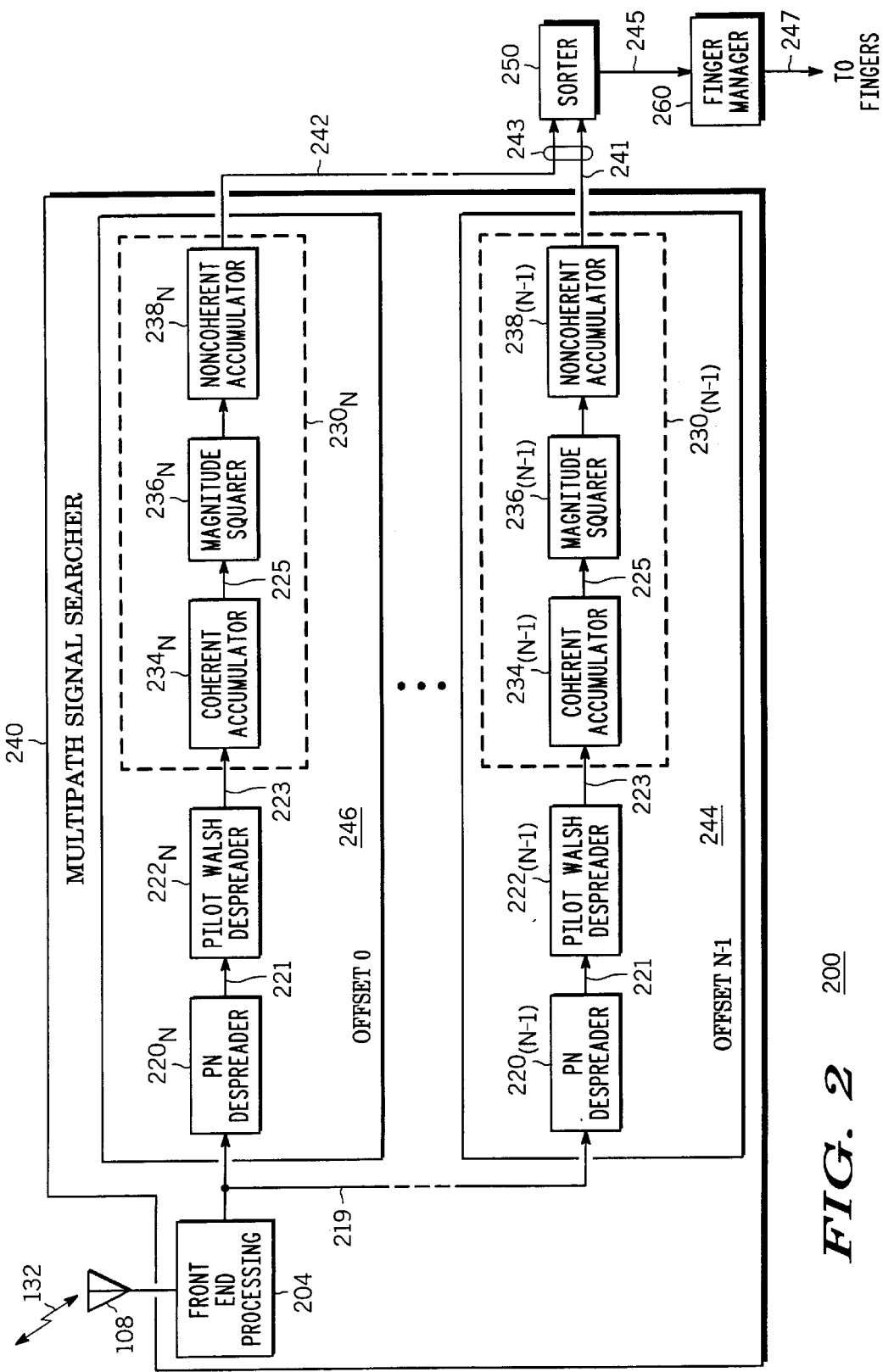
FIG. 2 is a block diagram of a multipath signal searcher assembly used to search for demodulable time offsets in multipath replicas resulting from transmission of mobile communication signals.

FIG. 2 is a block diagram of a multipath signal searcher assembly 200 used to search for demodulable time offsets associated with multipath replicas resulting from transmission of mobile communication signals. Multipath signal searcher assembly 200 includes a multipath signal searcher 240 for identifying a set of offset energies associated with the multipath replicas, a sorter 250 for sorting and selecting from the set of offset energies, and a finger manager 260 for directing receiver demodulation to occur at the selected offset(s).

Multipath signal searcher 240 includes a RF receiver front-end block 204 for front-end signal processing including down-converting, gain adjusting and analog to digital conversion. Multipath signal searcher 240 also includes a series of searcher paths, for example, search path 244 and search path 246. Each of the series of searcher paths corresponds to one time offset of a range of time offsets. The range of time offsets is determined by a search window algorithm. Thus, multipath signal searcher 240 may include a series of searcher paths, each searcher path corresponding to a range of time offsets from 0 to N−1, for example a 256 time offset range from 0 to 255 chip intervals. Accordingly, although only two searcher paths are illustrated in FIG. 2, there are typically N searcher paths in multipath signal searcher 240.

Each searcher path of multipath signal searcher 240 includes a PN despreader 220, a pilot signal Walsh code despreader 222, and an energy accumulator 230. Energy accumulator 230 further includes a coherent accumulator 234, a magnitude squarer 236, and a non-coherent accumulator 238. The output from non-coherent accumulator 238, a search energy 241 (discussed below), is combined with outputs from other searcher paths of multipath signal searcher 240 to form a set of search metrics 243 that is subsequently sorted by sorter 250.

In a sectorized antenna system such as CDMA wireless communication system 100, there are generally two antennas for each of the sectors, although only antenna 108 is shown in FIG. 2. For a typical time-diversity demodulation process, the searcher paths of multipath signal searcher 240 calculates offset energies of received multipath signals over a range of time offsets, incremented in ½ PN chip steps, to produce a set of offset energies for a set of antennas but does not demodulate or decode the information at these offsets. Sorter 250 sorts the set of offset energies, selects the offset energy having the highest value, and then compares it to a predefined energy threshold. A selected offset energy value that exceeds the predefined energy threshold indicates that a valid mobile station transmission has been captured at that particular time offset. Accordingly, if the selected offset energy exceeds the predefined threshold, finger manager 260 directs RAKE receiver demodulation and decoding (discussed in connection with FIG. 3) to occur at the time offset corresponding to the selected offset energy value.

Referring to FIG. 2, prior to sending a message signal (voice or data), a mobile station such as mobile station 130, transmits information to facilitate a call set-up or to register its location with a base station so that it may be notified of incoming calls. Mobile station 130 begins by first setting a transmit-power level to an initial value and then transmitting a known signal such as signal 132 referred to as a preamble. The preamble consists of a 4096 chip code sequence that is recognizable by a base station such as base station 102 and may be carried in signal 132. The preamble is a product of a pseudo-random code (discussed below) and a Walsh code (discussed below). Multipath signal searcher assembly 200 receives signal 132 in the form of multipath replicas via antenna 108. Front-end processing such as intermediate frequency demodulation, analog automatic gain control (AGC), and analog-to-digital (A/D) conversion of signal 132 is performed at RF receiver front-end block 204. In addition, RF receiver front-end block 204 further converts the digital signal output from the A/D converter to a set of gain adjusted in-phase (I) and quadrature (Q) components 219.

Set of gain adjusted in-phase (I) and quadrature (Q) components 219 is despread by a pseudo-random noise (PN) despreader 220 which removes the pseudo random code added to the mobile communication signal prior to transmission by mobile station 130. For each gain adjusted in-phase (I) and quadrature (Q) component, PN despreader 220 yields a corresponding combined despread preamble in-phase (I) and quadrature (Q) component 221 at a corresponding time offset. The combined despread preamble in-phase (I) and quadrature (Q) component 221 may contain preamble bits, data bits or a combination of preamble and data bits.

Combined despread preamble in-phase (I) and quadrature (Q) component 221 is further despread in pilot signal Walsh code despreader 222 via the removal of a series of Walsh Code zero's to produce a despread preamble signal portion 223. Despread preamble signal portion 223 is representative of the despread in-phase (I) and quadrature (Q) component of preamble and data in-phase (I) and quadrature (Q) components 223. Despread preamble signal portion 223 is processed by energy accumulator 230 to yield search energy 241 for signal 132 at it's corresponding time offset.

Energy accumulator 230 includes a coherent (or complex) accumulator 234, a magnitude squarer 236, and a non-coherent (or real) accumulator 238. Upon receipt by energy accumulator 230, despread pilot signal portion 223 is forwarded to coherent accumulator 234. Coherent accumulator 234 then coherently accumulates despread pilot signal portion 223 at the corresponding time offset to produce a pilot signal in-phase (I) and quadrature (Q) component 225 with an improved signal-to-noise ratio.

Next, the pilot signal in-phase (I) and quadrature (Q) component 225 is input to magnitude squarer 236 which computes an energy of the pilot signal in-phase (I) and quadrature (Q) component to produce a magnitude representative of a pilot signal strength. Non-coherent accumulator 238 then operates to produce search metric 241 which is representative of an offset energy at its corresponding time offset. Additional search metrics, equivalent in number to the number of time offsets searched by multipath signal searcher 240, are also produced to form a set of search metrics 243. For example, a search metric 242 at a time offset 0 is generated as a result of the operation of search path 246.

Sorter 250 receives the set of search metrics 243. Each search metric includes an offset energy value and a corresponding time offset, or offset index. Sorter 250 then selects the search metric having the largest offset energy value and compares that offset energy value with a predefined threshold. If the search metric having the largest offset energy value exceeds the predefined threshold an acknowledgment message is sent to the mobile station 130. Upon receipt of the acknowledgment message, mobile station 130 replies by transmitting its message frame. In addition, the time offset location corresponding to a largest offset energy 245 is forwarded to finger manager 260 to be used to assign RAKE receiver finger demodulation.

If however, upon receipt of the signal 132, multipath signal searcher assembly 200 detects no search metric which exceeds the predefined threshold, an acknowledgment message is not sent to mobile station 130. After a fixed period of time, mobile station 130 increases its transmit power and retransmits the preamble. The process repeats until the mobile station's transmit power is increased enough to cause an offset energy value exceeding a predefined threshold at multipath signal searcher assembly 200, or a maximum number of mobile station preamble transmissions is reached.

Although multipath signal searcher 240, as illustrated, is part of a RAKE receiver, it may also be implemented using an application specific integrated circuit (ASIC) or using other suitable means.

As is known in the art, a RAKE receiver first searches for likely demodulable time offsets associated with a mobile communication signal (described above in connection with FIG. 2), and second, begins demodulating the mobile communication signal at the likely demodulable time offsets (described below in connection with FIG. 3).

Figure 3:
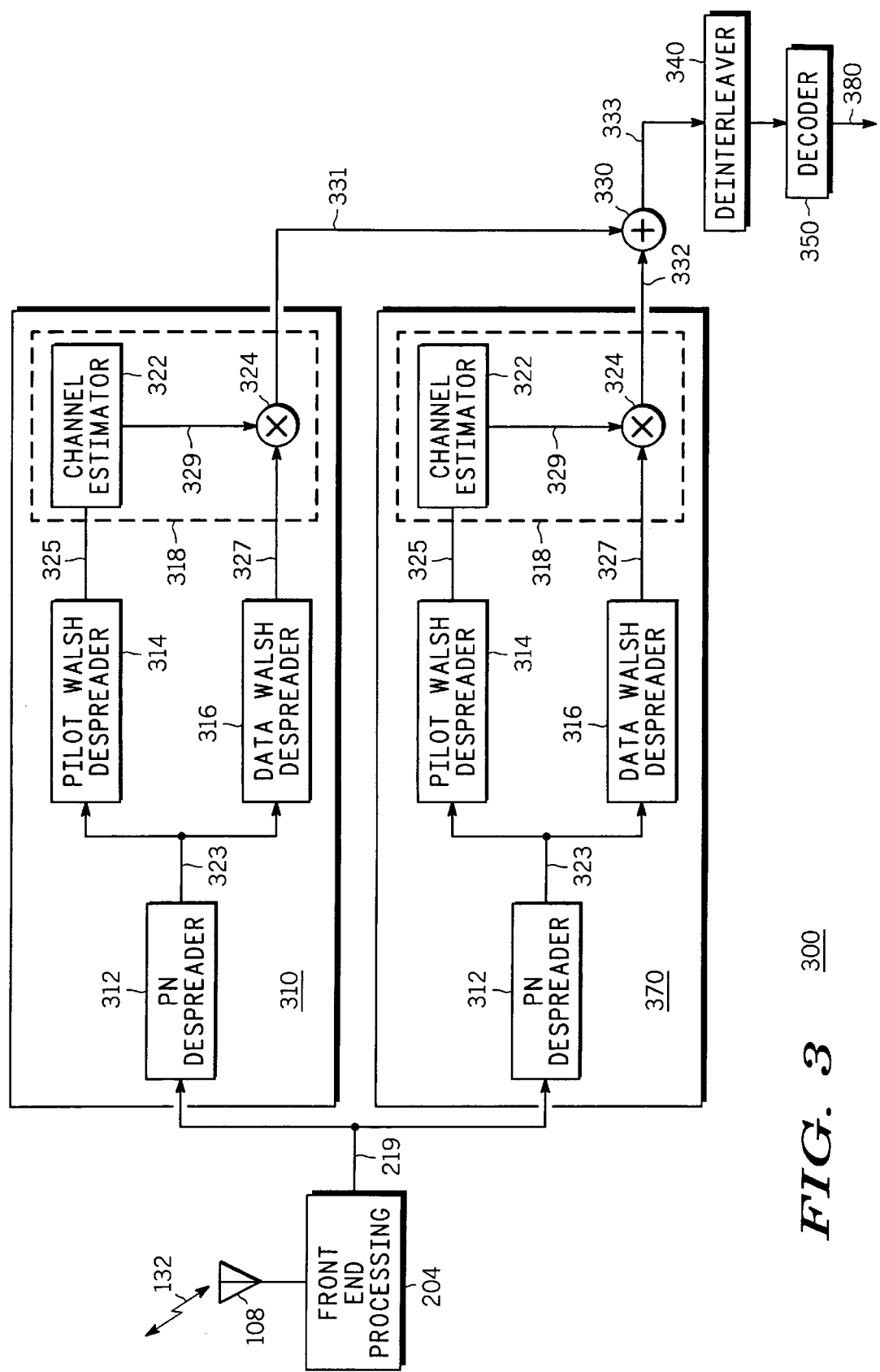
FIG. 3 is a block diagram of a RAKE used for demodulating the mobile communication signal at the time offsets selected by the multipath signal searcher assembly of FIG. 2.

FIG. 3 is a partial block diagram of a RAKE receiver 300 used for demodulating signal 132 and its multipath replicas at the time offsets previously selected by multipath signal searcher assembly 200 shown in FIG. 2. RAKE receiver 300 includes an antenna 108 for receiving incoming signals, and a RF receiver front-end block 204 for front-end processing. RAKE receiver 300 further includes a number of receiver finger demodulator paths, typically eight, although only two finger demodulator paths 310 and 370 are shown in detail. Each of the number of RAKE receiver finger demodulator paths is assigned to demodulate received signal 132 at a time offset determined, by multipath signal searcher assembly 200 of FIG. 2, to likely have signal 132. RAKE receiver 300 also includes a combiner 330 for combining the receiver finger signal streams output from the receiver finger demodulator paths, and a deinterleaver 340 and a decoder 350.

RAKE receiver 300 receives signal 132 via antenna 108. As in the multipath search assembly 200, front-end processing such as intermediate frequency demodulation, analog automatic gain control (AGC), and analog-to-digital (A/D) conversion of CDMA signal 132 is performed by well known methods and circuits at RF receiver front-end block 204. In addition, RF receiver front-end block 204 further converts the digital signal, output from the A/D converter, to a set of gain adjusted in-phase (I) and quadrature (Q) components 219.

Set of gain adjusted in-phase (I) and quadrature (Q) components 219 at an assigned time offset is input to receiver finger demodulator path 310 for transformation into a receiver finger signal stream 331. Receiver finger demodulator path 310 includes a finger PN despreader 312, a pilot signal Walsh code despreader 314, a data signal Walsh code despreader 316, and a finger data signal demodulator 318. Set of gain adjusted in-phase (I) and quadrature (Q) components 219 received by receiver finger demodulator path 310 is despread by finger PN despreader 312 which removes a pseudo random code added to signal 132 prior to transmission by mobile station 130. For each gain adjusted in-phase (I) and quadrature (Q) component, finger PN despreader 312 yields a corresponding combined finger despread pilot and data in-phase (I) and quadrature (Q) component 323 at the assigned time offset corresponding to the largest offset energy detected above a predetermined threshold by multipath signal searcher assembly 200 shown in FIG. 2.

Finger despread pilot and data in-phase (I) and quadrature (Q) component 323 are forwarded to pilot signal Walsh code despreader 314 for despreading to produce a finger despread pilot signal portion 325. Similarly, finger despread pilot and data in-phase (I) and quadrature (Q) components 323 are forwarded to data signal Walsh code despreader 316 for despreading to produce a finger despread data signal portion 327. Finger despread pilot signal portion 325 and finger despread data signal portion 327 are then demodulated in finger data signal demodulator 318 to produce receiver finger signal stream 331 at the assigned time offset.

Finger data signal demodulator 318 includes a channel estimator 322, and a complex multiplier 324. Finger despread pilot signal portion 325 received by channel estimator 322 is utilized to estimate a phase angle 329 associated with finger despread pilot signal portion 325. The phase angle is the result of a propagation delay associated with signal 132. A conjugate of resulting phase angle 329 is multiplied with finger despread data signal portion 327 in complex multiplier 324 to yield receiver finger signal stream 331 at the assigned time offset.

Combiner 330 then combines receiver finger signal stream 331 with additional receiver finger signal streams, for example receiver finger signal stream 332, resulting from each of the number of RAKE receiver finger demodulator paths assigned to demodulate received signal 132. Thus, receiver finger signal streams from both receiver finger demodulator path 310 and receiver finger demodulator path 370 are combined if both receiver finger demodulator path 310 and receiver finger demodulator path 370 were assigned to time offsets by finger manager 260 shown in FIG. 2. A combined signal symbol stream 333 composed of an estimate of transmitted channel symbols, is received by deinterleaver 340. Deinterleaver 340 restores an order to combined signal symbol stream 333 to yield a sequence of deinterleaved transmitted channel symbols representative of the signal 132. The sequence of deinterleaved transmitted channel symbols are input to a decoder 350 which estimates a sequence of information bits from the sequence of deinterleaved transmitted channel symbols and outputs a decoded signal 380 representative of signal 132. RAKE receiver 300 may be implemented using an application specific integrated circuit (ASIC) or using other suitable means.

As previously discussed in connection with FIG. 2, a mobile station may transmit a preamble to a base station prior to call set-up. Upon receipt of the mobile station transmission, the base station searches for the code sequence which represents the preamble. If multipath signal searcher assembly 200 detects the preamble, the base station declares detection and sends an acknowledgment of receipt to the mobile station. Multipath signal searcher assembly 200 also directs RAKE receiver demodulation to occur at time offsets determined to be associated largest offset energy 245. If, however, the base station does not detect the preamble sent by mobile station 130, an acknowledgment is not sent and the mobile station increases it's transmit power.

Figure 4:
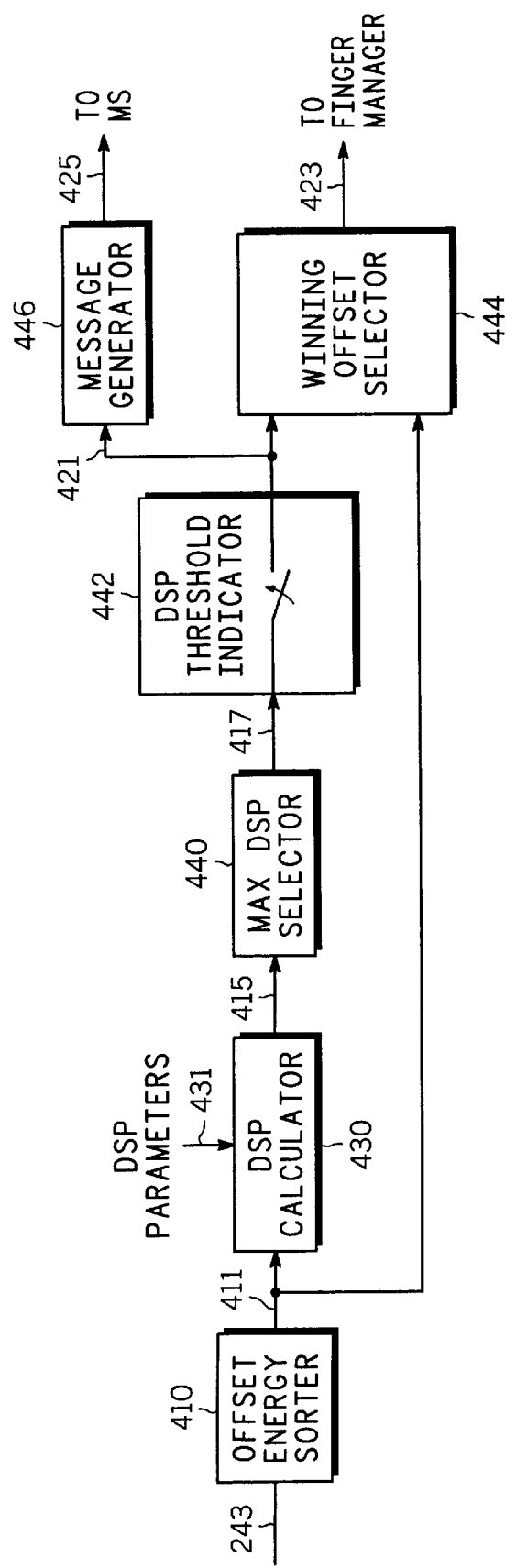
FIG. 4 is a block diagram of an embodiment of an effective ray detector for signal detection and assignment of the mobile communication signal.

FIG. 4 is a block diagram of an effective ray detector 400 for signal detection and assignment of a mobile communication signal, according to a preferred embodiment of the present invention. Effective ray detector 400 includes an offset energy sorter 410, a decoding success predictor (DSP) calculator 430, a maximum DSP selector 440, a DSP threshold indicator 442, a winning offset selector 444, and a message generator 446.

Effective ray detector 400 has, as its input, set of search metrics 243 output from multipath signal searcher 240 shown in connection with FIG. 2. As previously described, search metrics 243 are generated by multipath signal searcher 240 upon receipt of multipath signals resulting from signal 132. The set size of input set of search metrics 243 is determined by the search window algorithm. As described in connection with FIG. 2., the search window algorithm may select a range of time offsets to be searched and each time offset may be represented as an offset energy. Therefore, a search window may be represented as a series of offset energies, each offset energy having an offset index and a corresponding offset energy value.

For example, $x = [x_0, x_1, x_2, \ldots x_{N-1}]$ where search metric $x_0$ has an offset index of 0 and an offset energy value of 5, search metric $x_1$ has an offset index of 1 and an offset energy value of 4, and search metric $x_2$ has an offset index of 2 and an offset energy value of 6.

That is,

| Search Metric | Offset Index | Offset Energy Value |
|---|---|---|
| $x_0$ | 0 | 5 |
| $x_1$ | 1 | 4 |
| $x_2$ | 2 | 6 |

Set of search metrics 243 received by effective ray indicator 400 may be sorted by offset energy sorter 410 which sorts them in descending order of their corresponding offset energy values to produce a sorted set of search metrics 411. Thus, in the above example, search metric $x_2$ has an offset energy value of 6 and would therefore, be at the top of the sort, followed by search metric $x_0$ having an offset energy value of 5, and then search metric $x_1$ having an offset energy value of 4. Accordingly, each of the sorted search metrics 411, having an original offset energy value and an original corresponding offset index, is assigned a new sorted search metric which is based upon its original offset energy value. Thus, each sorted search metric has a sorted offset index equal to its original offset index, but sorted based on its corresponding original offset energy value. For example, $y=[y_0, y_1, y_2, \ldots y_{N-1}]$ where $y_0$ has an offset index of 2 and an offset energy value of 6, $y_1$ has an offset index of 0 and an offset energy value of 5, and $y_2$ has an offset index of 1 and an offset energy value of 4.

That is,

| Sorted Search Metric | Sorted Offset index | Sorted Offset Energy Value |
|---|---|---|
| $y_0$ | 2 | 6 |
| $y_1$ | 0 | 5 |
| $y_2$ | 1 | 4 |

Thus, in the above example, sorted search metric $y_0$, at the top of the sort with an offset energy value of 6, has a sorted offset index of 2 which is equal to the original offset index number corresponding to its original offset energy value. Similarly, search metric $y_1$, next in the sort with an offset energy value of 5, has a sorted offset index of 0 which is equal to its original offset index number corresponding to its original offset energy value, and so on. Thus, each of the sorted set of search metrics 411 may be described as a sorted offset index and a corresponding sorted offset energy value.

A decoding success predictor (DSP) calculator 430 having as input the offset energy values of sorted set of search metrics 411, and a set of DSP parameters 431 or multipath combining penalty values, calculates a set of DSP values 415 at corresponding DSP indices. Each of the set of DSP values 415 reflects a likelihood of successful mobile communication signal demodulation at offset indices corresponding to the offset energy values used to calculate the DSP value.

Each of the set of DSP values 415 is calculated in DSP calculator 430 by adding a multipath combining penalty value to one or more offset energy values. The multipath combining penalty value(s) are preselected to correspond to an aggregate noise contribution based on the number of multipath rays used to calculate each particular DSP value. Thus, as the number of multipath rays used to calculate a DSP increase, so too does the negative value of the multipath combining penalty value.

Optimally, a set of three DSP values may be calculated by DSP calculator 430 using the three sorted offset energy values associated with sorted search metrics y. The first DSP value of the set of three DSP values corresponds to a sum of the largest sorted offset energy value and a penalty value representative of a noise contribution from one multipath ray. The second DSP value of the set of three DSP values corresponds to a sum of the largest and second largest sorted offset energy values and a penalty value representative of a noise contribution from two multipath ray. For example, DSP calculator 430 calculates a first DSP value by adding the offset energy value corresponding to the first sorted search metric (corresponding to the largest sorted offset energy value) and a first penalty value. The first DSP value has a DSP index of one. Similarly, a second DSP value is calculated by adding the offset energy value corresponding to the first sorted search metric and the offset energy value corresponding to the second sorted search metric and a second penalty value to form a second DSP. The second DSP value has a DSP index of two. Similarly, a third DSP value is calculated by adding the offset energy value corresponding to the first sorted search metric and the offset energy value corresponding to the second sorted search metric and the offset energy value corresponding to the third sorted search metric and a third penalty value to form a third DSP. The third DSP value has a DSP index of three. Thus, $DSP_1 = y_0 + PV_1 = 6 + (PV_1) = 5$ $DSP_2 = y_0 + y_1 + (PV_2) = 11 + (PV_2) = 8$ $DSP_3 = y_0 + y_1 + y_2 + (PV_3) = 15 + (PV_3) = 7$ where $PV_1 = -1$, $PV_2 = -3$, $PV_3 = -8$ and $DSP_1$ has a DSP index=1, $DSP_2$ has a DSP index=2, and $DSP_3$ has a DSP index=3. $DSP_2$ yields the highest DSP value of 8.

Three DSP values were calculated in the above example, however, a larger set of DSP values may be calculated depending on the number of search metrics selected.

Maximum DSP selector 440 selects the DSP value having a maximum value from among the set of DSP values 415. The selected maximum DSP value 417 has a corresponding DSP index equivalent to the number of sorted search metrics used to calculate its value. Maximum DSP value 417 is then compared to a predefined threshold, for example zero, at DSP threshold indicator 442. A maximum DSP value 417 which exceeds the predefined threshold indicates the presence of signal energy associated with a multipath ray. If maximum DSP value 417 exceeds the threshold, effective ray detector 400 declares detection of signal 132 and generates an acknowledgment message 425 at message generator block 446. Upon receipt of acknowledgment message 425, mobile station 130 discontinues its transmit power ramp-up and may begin transmitting its message signal. In addition, winning offset selector 444 utilizes maximum DSP value 417 in conjunction with sorted set of search metrics 411 to select offset indices 423 corresponding to the offset energy values used to calculate maximum DSP value 417. The time offset locations associated with selected offset indices 423 are then forwarded to finger manager 260 for RAKE receiver finger assignment and subsequent message demodulation and decoding as described in connection with FIG. 3.

Thus, unlike sorter 250 described in connection with FIG. 2, effective ray detector 400 may enable signal detection based upon a combination of two multipath signals that may not, independent of each other, comprise sufficient signal energy to be detected, demodulated and decoded by a RAKE receiver. For example DSP2, determined to be the maximum DSP having a value of 8 and a DSP index of 2, has a value greater than zero. Accordingly, a combination of the two multipath signals located at the offset indices corresponding to the offset energy values used to calculate DSP2 contain enough signal energy to enable reliable message decoding. Thus, reliable mobile communication message decoding may be accomplished using a combination of secondary multipath rays rather than one primary multipath ray, thereby increasing the sensitivity of the multipath signal searcher while lowering the transmit power required by the mobile station.

In an alternate embodiment, DSP calculator 430 can receive set of search metrics 243 directly from multipath signal searcher 240 instead of receiving sorted set of search metrics 411. In that case, DSP calculator 430, again also having as input set of DSP parameters 431, calculates a set of DSP values based on the offset energy values of set of search metrics 243. For example, DSP calculator 430 calculates a first DSP value by adding the largest offset energy value and a first penalty value. The offset index corresponding to the largest offset energy value is noted. Similarly, a second DSP value is calculated by adding the largest offset energy value and the second largest offset energy and a second penalty value to form a second DSP. The offset indices corresponding to the largest offset energy value and the second largest offset energy value is noted. Upon determining a maximum DSP having value greater than zero, an acknowledgment message is sent to the mobile station and RAKE receiver finger demodulation is directed to occur at those time offset locations associated with the maximum DSP.

Figure 5:
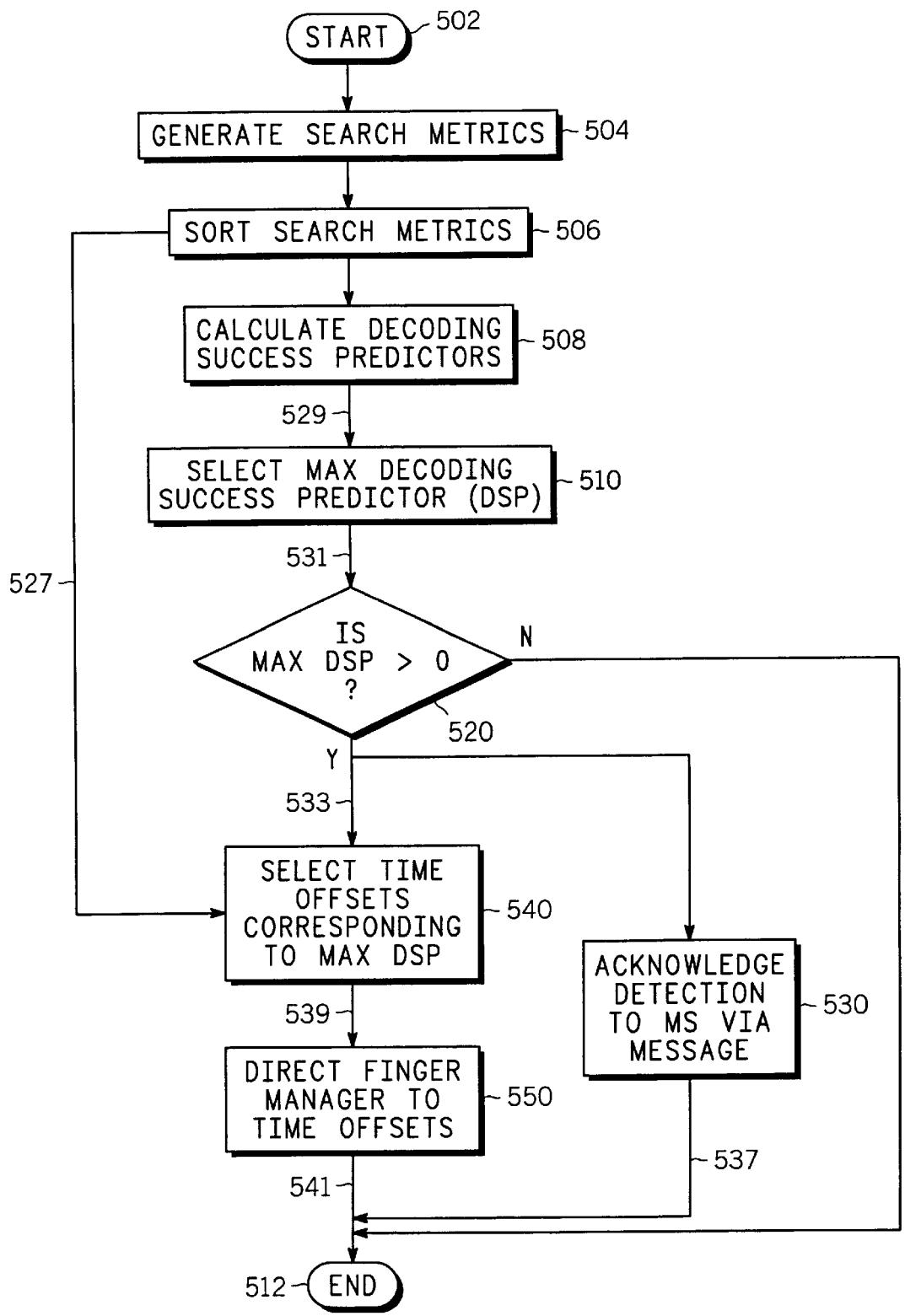
FIG. 5 is a flowchart of a method for signal detection and assignment of the mobile communication signal in the wireless communication system.

FIG. 5 is a flow chart 500 of a method for signal detection and assignment of the mobile communication signal according to a preferred embodiment of the present invention. A set of search metrics generated by a multipath signal searcher may be utilized by the effective ray detector of FIG. 4 to allow signal detection and RAKE receiver finger assignment based upon a combination of two multipath signals that may not, independent of each other, comprise sufficient signal energy to be detected. The method begins at start step 502 with a receipt of a plurality of multipath signals resulting from a mobile communication signal. At step 504, a multipath signal searcher, such as multipath signal searcher 240, generates a corresponding plurality of search metrics, for example, set of search metrics 243, from a plurality of multipath signals. Each search metric includes an offset energy value at a corresponding offset location, herein referred to as an offset index. The search metrics are sorted at step 506 by offset energy sorter 410 in descending order of their offset energy values to yield a plurality of sorted search metrics. Each of the plurality of sorted search metrics has a corresponding plurality of sorted offset indices and a corresponding plurality of sorted offset energy values. Thus, the first of the plurality of sorted search metrics corresponds to the search metric having the largest original offset energy value, the second of the plurality of sorted search metrics corresponds to the search metric having the second largest original offset energy value, and so on.

The sorted offset energy values are then used in conjunction with predetermined DSP parameters, to calculate a plurality of decoding success predictors at step 508. The predetermined DSP parameters represent a noise aggregate of one or more multipath signals and are therefore referred to as penalty values. Accordingly, as the number of multipath rays used to calculate the DSP increases, so too does the penalty value contribution. The plurality of decoding success predictors (DPS) calculated at step 508 by DSP calculator 430 indicate a likelihood of successful mobile station signal demodulation. A set of three DSP values may be calculated, however, a larger set may also be utilized. For example, the first DSP is calculated by adding the offset energy value corresponding to the first sorted search metric, or the search metric having the largest offset energy value, with a first penalty value. The first penalty value represents a predetermined noise aggregate of one multipath ray. The second DSP is calculated by adding the offset energy value corresponding to the first sorted search metric, to the offset energy value corresponding to the second sorted search metric, or the search metric having the second largest offset energy value, to a second penalty value to form a second decoding success predictor. The second penalty value represents a predetermined noise aggregate of two multipath rays. Similarly, the third DSP is calculated by adding the offset energy value corresponding to the first sorted search metric, to the offset energy value corresponding to the second sorted search metric, to the offset energy corresponding to the third sorted search metric, or the search metric having the third largest offset energy value, to a third penalty value to form a third decoding success predictor. The third penalty value represents a predetermined noise aggregate of three multipath rays.

The DSP having the maximum value is selected at step 510. The maximum DSP may be calculated using one, two or three offset energy values and thus may be associated with one, two or three offset indices. If the maximum DSP has a value greater than zero at step 520, indicating the presence of one or more multipath rays, a mobile station signal detection is declared and an Acknowledgment message is sent to the mobile station at step 530. If the maximum DSP does not have a value greater than zero at step 520, indicating no detection of the preamble signal, the process completes.

Upon detecting the presence of one or more mutipath rays as indicated by a maximum DSP having a value greater is zero, the original offset indices corresponding to the offset energy values used to calculate the maximum DSP are selected at step 540. The original offset indices corresponding to the offset energy values used to calculate the maximum DSP represent the time offset or time offsets where optimum mobile communication signal demodulation can occur. Thus, at step 550, RAKE receiver fingers are directed to demodulate at the original offset indices corresponding to the offset energy values used to calculate the maximum DSP.

In summary, persons of ordinary skill in the art will readily appreciate that a method and apparatus for performing a signal detection and RAKE receiver finger assignment in a wireless communication system has been provided. Users of systems implementing the teachings described herein will note that the sensitivity of a base station receiver to a mobile station preamble signal is increased. In addition, because the sensitivity of the base station receiver is increased, the mobile station will not have to operate at increased power levels required by the prior art algorithms.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description, but rather by the claims appended hereto.

What is claimed:

1. In a code division multiple access wireless communication system, the system including an antenna, a base station multipath signal searcher for generating a plurality of search metrics from a plurality of multipath signals of a mobile station signal, and a base station transceiver for demodulating the mobile station signal, a method for detecting the mobile station signal comprising the steps of:

receiving the plurality of search metrics, each of the plurality of search metrics having an offset index and an offset energy value, the offset index corresponding to one of a plurality of time offsets associated with a multipath signal of the mobile station signal;

calculating a plurality of decoding success predictors based on a plurality of combinations of the offset energy values, the plurality of decoding success predictors indicating a likelihood of successful mobile station signal demodulation;

selecting a maximum decoding success predictor from the plurality of decoding success predictors; and acknowledging a mobile station signal detection by the base station transceiver if the maximum decoding success predictor has a value greater than zero.

2. A method for detecting the mobile station signal according to claim 1, wherein the step of calculating the plurality of decoding success predictors comprises the steps of:

adding the largest offset energy value of the plurality of offset energy values and a first penalty value to form a first decoding success predictor; and adding the largest offset energy value of the plurality of offset energy values and the second largest offset energy value of the plurality of offset energy values and a second penalty value to form a second decoding success predictor.

3. A method for detecting the mobile station signal according to claim 2, wherein the first penalty value represents a predetermined noise aggregate of one of the plurality of multipath signals.

4. A method for detecting the mobile station signal according to claim 2, wherein the second penalty value represents a predetermined noise aggregate of two of the plurality of multipath signals.

5. A method for detecting the mobile station signal according to claim 1, wherein the step of acknowledging the mobile station signal detection further comprises sending an Acknowledgment Message to the mobile station, the Acknowledgment Message indicating to a mobile station that the mobile station signal was transmitted at a sufficient power level.

6. A method for detecting the mobile station signal according to claim 1, wherein the mobile station signal is selected from the group consisting of a mobile station signaling signal, a mobile station voice signal, and a mobile station data signal.

7. A method for detecting the mobile station signal according to claim 1, further comprising the steps of:

selecting a subset of a plurality of offset indices corresponding to the plurality of combinations of the offset energy values used to calculate the maximum decoding success predictor to form a detected set of offset indices;

forwarding the detected set of offset indices to the base station transceiver; and assigning demodulation of the mobile station signal to occur at the detected set of offset indices.

8. A method for detecting the mobile station signal according to claim 1, further comprising the step of sorting the plurality of search metrics in descending order of their offset energy values to yield a plurality of sorted search metrics, each of the plurality of sorted search metrics having a sorted offset index and a sorted offset energy value.

9. A method for detecting the mobile station signal according to claim 8, wherein the step of calculating the plurality of decoding success predictors comprises:

adding the sorted offset energy value corresponding to the first of the plurality of sorted search metrics and a first penalty value to form a first decoding success predictor; and adding the sorted offset energy value corresponding to the first of the plurality of sorted search metrics and the sorted offset energy value corresponding to the second of the plurality of sorted search metrics and a second penalty value to form a second decoding success predictor.

10. A method for detecting the mobile station signal according to claim 9, wherein the first penalty value represents a predetermined noise aggregate of one of the plurality of multipath signals.

11. A method for detecting the mobile station signal according to claim 9, wherein the second penalty value represents a predetermined noise aggregate of two of the plurality of multipath signals.

12. A method for detecting the mobile station signal according to claim 8, wherein the step of acknowledging the mobile station signal detection further comprises sending an Acknowledgment Message to a mobile station, the Acknowledgment Message indicating to the mobile station that the mobile station signal was transmitted at a sufficient power level.

13. A method for detecting the mobile station signal according to claim 8, wherein the mobile station signal is selected from the group consisting of a mobile station signaling signal, a mobile station voice signal, and a mobile station data signal.

14. A method for detecting the mobile station signal according to claim 8, further comprising the steps of:

selecting a subset of a plurality of offset indices corresponding to the plurality of combinations of the offset energy values used to calculate the maximum decoding success predictor to form a detected set of offset indices;

forwarding the detected set of offset indices to the base station transceiver; and assigning demodulation of the mobile station signal to occur at the detected set of offset indices.

15. In a code division multiple access wireless communication system, the system including an antenna, a base station multipath signal searcher and a base station transceiver, a method for detecting and assigning a mobile communication signal comprising the steps of:

receiving a first multipath signal having a first offset energy at a first time offset, the first multipath signal resulting from the mobile communication signal;

receiving a second multipath signal having a second offset energy at a second time offset, the second multipath signal resulting from the mobile communication signal;

receiving a third multipath signal having a third offset energy at a third time offset, the third multipath signal resulting from the mobile communication signal;

generating a first search metric, the first search metric having a first offset index and a first offset energy value, the first offset index corresponding to the first time offset;

generating a second search metric, the second search metric having a second offset index and a second offset energy value, the second offset index corresponding to the second time offset;

generating a third search metric, the third search metric having a third offset index and a third offset energy value, the third offset index corresponding to the third time offset;

sorting the search metrics in descending order of their corresponding offset energy values to yield a sorted search metric set, the sorted search metric set including:

a first sorted search metric corresponding to the search metric having largest offset energy value, the first sorted search metric having a first sorted offset index;

a second sorted search metric corresponding to the second largest offset energy value, the second sorted search metric having a second sorted offset index; and a third sorted search metric corresponding to the third largest offset energy value, the third sorted search metric having a third sorted offset index;

adding the offset energy value corresponding to the first sorted search metric and a first penalty value to form a first decoding success predictor;

adding the offset energy value corresponding to the first sorted search metric and the offset energy value corresponding to the second sorted search metric and a second penalty value to form a second decoding success predictor;

adding the offset energy value corresponding to the first sorted search metric and the offset energy value corresponding to the second sorted search metric and the offset energy value corresponding to the third sorted search metric and a third penalty value to form a third decoding success predictor;

selecting a maximum decoding success predictor, the maximum decoding success predictor having the highest value;

directing the base station transceiver to send a message if the maximum decoding success predictor has a value greater than zero;

selecting the offset indices corresponding to the offset energy values used to calculate the maximum decoding success predictor, to form a detected set of offset indices if the maximum decoding success predictor has a value greater than zero;

forwarding the detected set of offset indices to the base station transceiver; and assigning demodulation of the mobile communication signal to occur at the detected set of offset indices.

16. A method for detecting and assigning the mobile station signal according to claim 15, wherein the first penalty value represents a predetermined noise contribution by one multipath signal resulting from the mobile communication signal.

17. A method for detecting and assigning the mobile station signal according to claim 15, wherein the second penalty value represents a predetermined noise contribution by two multipath signals resulting from the mobile communication signal.

18. The method for detecting and assigning the mobile station signal according to claim 15, wherein the third penalty value represents a predetermined noise contribution by three multipath signals resulting from the mobile communication signal.

19. A method for detecting and assigning the mobile station signal according to claim 15, wherein the message is an Acknowledgment Message declaring a detection to a mobile station, the Acknowledgment Message indicating to the mobile station that the mobile station signal was transmitted at a sufficient power level.

20. An effective ray detector for use in a code division multiple access wireless communication system conveying a mobile station signal, the code division multiple access wireless communication system including an antenna, a base station multipath signal searcher for generating a plurality of search metrics from the mobile station signal, and a base station transceiver for demodulating the mobile station signal, the effective ray detector comprising:

an offset energy sorter adapted to sort a plurality of received search metrics having a corresponding plurality of received offset indices and a corresponding plurality of received offset energy values to yield a plurality of sorted search metrics, the plurality of sorted search metrics having a corresponding plurality of sorted offset indices and a corresponding plurality of sorted offset energy values, the plurality of received offset indices corresponding to a plurality of time offsets of a plurality of multipath signals resulting from the mobile station signal;

a decoding success predictor calculator adapted to calculate a plurality of decoding success predictors corresponding to a plurality of combinations of the sorted offset energy values, the plurality of decoding success predictors indicating a likelihood of successful mobile station signal demodulation;

a max decoding success predictor selector adapted to select a maximum decoding success predictor from the plurality of decoding success predictors, the maximum decoding success predictor having the highest value;

a decoding success predictor threshold indicator adapted to forward the maximum decoding success predictor if the maximum decoding success predictors has a value greater than zero; and a winning offset selector adapted to select a subset of the plurality of sorted offset indices corresponding to the plurality of combinations of the sorted offset energy values used to calculate the maximum decoding success predictor to form a detected set of offset indices.

21. The effective ray detector according to claim 20, further comprising a message generator adapted to direct the base station receiver to send a message, the message indicating to a mobile station that the mobile station signal was transmitted at a sufficient power level.

22. The effective ray detector according to claim 20, further comprising a base station receiver finger manager adapted to assign demodulation of the mobile station signal to occur at the detected set of offset indices.

23. The effective ray detector according to claim 20, wherein calculating the plurality of decoding success predictors comprises:

adding the sorted offset energy value corresponding to the first of the plurality of sorted search metrics and a first penalty value to form a first decoding success predictor; and adding the sorted offset energy value corresponding to the first of the plurality of sorted search metrics and the sorted offset energy value corresponding to the second of the plurality of sorted search metrics and a second penalty value to form a second decoding success predictor.

24. The effective ray detector according to claim 23, wherein the first penalty value represents a predetermined noise aggregate of one of the plurality of multipath signals.

25. The effective ray detector according to claim 23, wherein the second penalty value represents a predetermined noise aggregate of two of the plurality of multipath signals.

* * * * *